United States Patent [19]

Nowak et al.

[11] Patent Number: 5,796,598
[45] Date of Patent: Aug. 18, 1998

[54] VOLTAGE-CONVERTING CIRCUIT FOR THE POWER SUPPLY OF AN ELECTRICAL CONSUMER OF HIGH OUTPUT, PARTICULARLY A BOBBIN WINDING MACHINE

[75] Inventors: Hans-Georg Nowak; Michael Quante; Frank Wefers, all of Mönchengladbach; Franz-Josef Flamm, Stolberg, all of Germany

[73] Assignee: W. Schlafhorst AG & Co., Moenchengladbach, Germany

[21] Appl. No.: 789,635

[22] Filed: Jan. 27, 1997

[30] Foreign Application Priority Data

Nov. 29, 1996 [DE] Germany ............... 196 02 745.4

[51] Int. Cl.$^6$ ........................................ H02M 5/45
[52] U.S. Cl. ................................................ 363/37
[58] Field of Search ............................... 363/34, 35, 37

[56] References Cited

U.S. PATENT DOCUMENTS

| | | | |
|---|---|---|---|
| 4,719,550 | 1/1988 | Powell et al. | 363/37 |
| 5,297,015 | 3/1994 | Miyazaki et al. | 363/146 |
| 5,504,667 | 4/1996 | Tanaka et al. | 363/37 |
| 5,644,483 | 7/1997 | Peng et al. | 363/37 |

FOREIGN PATENT DOCUMENTS

| | | |
|---|---|---|
| 0 146 876 A2 | 7/1985 | European Pat. Off. |
| 38 19 978 A1 | 12/1989 | Germany. |
| 41 34 461 A1 | 4/1993 | Germany. |
| 9403447 4 | 6/1994 | Germany. |
| 44 16 353 A1 | 11/1995 | Germany. |
| 4-317565 | 11/1992 | Japan. |

OTHER PUBLICATIONS

Fu-Sheng Tsai, "Small-Signal and Transient Analysis of a zero-Voltage-Switched, Phase-Controlled PWM Converter Using Averaged Switch Model", 1993, pp. 493-499.

Kutkut et al., "An Improved Full-Bridge Zero-Voltage Switching PWM Converter Using a Two-Inductor Rectifier", 1995, pp. 119-126.

*Primary Examiner*—Matthew V. Nguyen
*Attorney, Agent, or Firm*—Kennedy Covington Lobdell & Hickman, LLP

[57] ABSTRACT

An electric circuit for the conversion of a multiplicity of commercial power voltages to a predetermined supply voltage which is independent of the respective commercial power voltage, for a device with high electrical power requirements of high output, in the range up to 40 kW, such as a bobbin winding machine. The circuit contains a rectifier stage for generating a primary intermediate circuit DC voltage, a converter stage with power switches for generating a rectangular AC voltage, a high-power transformer with a connected secondary control circuit and a control stage which triggers the power switches at zero voltage in a phase-shift mode with a variable frequency and pulse width of the rectangular AC voltage as a function of the input voltage of the rectifier stage, the transformer primary winding current and both the voltage and the current in the secondary intermediate circuit.

5 Claims, 1 Drawing Sheet

5,796,598

VOLTAGE-CONVERTING CIRCUIT FOR THE POWER SUPPLY OF AN ELECTRICAL CONSUMER OF HIGH OUTPUT, PARTICULARLY A BOBBIN WINDING MACHINE

FIELD OF THE INVENTION

The present invention relates broadly to electrical circuits associated with power conversion, and, more particularly, to a circuit for the conversion of a multiplicity of commercial power voltages to a supply voltage which is independent of the respective commercial power voltage and which is to be used in connection with a device with high electrical power requirements, such as a bobbin winding machine.

BACKGROUND OF THE INVENTION

Bobbin winding machines of current design typically operate at a DC supply voltage of approximately 260 V and with a high power requirement between 20 kW and 40 kW. In order to obtain such a supply voltage from the voltages of the various commercial power supplies throughout the world, which vary between approximately 180 V and 600 V at frequencies of approximately 50 Hz to 60 Hz, it is customary to employ a thyristor rectifier connected to one of approximately thirty different transformer circuits depending upon the commercial power voltage provided in the country in which the electrical application will be operated.

In addition to providing the necessary electrical current, the respective transformer must assure the required electrical separation between the power grid voltage and the machine power supply voltage. Not only does this conventional power supply for bobbin winding machines require a relative large technical effort because of the large number of different transformer types required for covering the different commercial power grid voltages throughout the world, the power supply also has only moderate output stability because of large control time constants, in addition to a relatively low degree of effectiveness, high weight and large space requirements.

It is known to use voltage-converting circuit arrangements for the energy supply of electrical devices with a power requirement of up to approximately 10 kW, which is lower than the requirement for the above mentioned bobbin winding machines. For application having somewhat greater power requirements, voltage-converting circuit arrangements of the push-pull transducer type with a full bridge transducer stage containing four transistor power switches controlled by a control stage are used.

Because of the limited maximum permissible load of the components used, among other things, it is not possible by simply increasing the size of the individual components to modify such voltage-converting circuit arrangements of comparatively low power outputs into voltage-converting circuit arrangements which, by means of the same type of functioning, can transmit a higher power output. Instead, additional special steps are required for this if one is to avoid the parallel connection of several voltage converting circuit arrangements of the same type, which increases the technical outlay. Such a step is the so-called zero voltage switching of the power switches with pulse- width-modulated control, such as described in N. H. Kutkut et al, "An Improved Full-Bridge Zero-Voltage Switching PWM Converter Using a Two-Inductor Rectifier", IEEE Transactions on Industry Applications, Vol. 31, No. 1, January/February 1995, page 119, in connection with voltage converting circuit arrangements with a power output up to 10 kW. A voltage converting circuit arrangement with similar functions and with a power output of 500 W is described in the 1994 Data Book from the Unitrode Company under the application identifier U-136.

SUMMARY OF THE PRESENT INVENTION

It is accordingly an object of the invention to provide an electrical circuit for converting any one of a plurality of commercial power voltages to a supply voltage for an electrical application with high power requirements of 20 kW and above, such as a bobbin spinning machine.

It is another object of the present invention to provide such an electrical circuit that can be produced with comparatively little technical outlay.

It is another object of the present invention to provide such an electrical circuit which will provide the required power supply voltage, without further requirements to adapt such a circuit to different commercial power grid voltages.

To those ends, an electrical circuit for the conversion of a multiplicity of commercial power voltages into a supply voltage for an device with high electrical power requirements, such as a textile bobbin winding machine, said supply voltage being independent of the respective commercial power voltage value is provided. The electrical circuit includes a rectifier assembly for generating a primary intermediate circuit DC voltage in a range of 300 V to 1000 V and for filtering the commercial power voltage of between approximately 180 V and approximately 600 V; a converter assembly having a plurality of triggerable power switches for converting said primary intermediate circuit DC voltage into an AC voltage having a rectangular waveform; a high-power transformer having an intermediate circuit connected thereto for transforming said AC voltage having a rectangular waveform into the supply voltage; and a control assembly for switching said power switches at zero voltage responsive to the primary intermediate circuit DC voltage, the current in the primary winding of said high-power transformer, and the voltage and the current in the secondary intermediate circuit, switching said power switches using a variable pulse width of the rectangular AC voltage required for achieving the necessary supply voltage. It is preferred that the variable pulse width be used with a variable frequency for setting a transformer primary winding current, which is sufficient for storing the energy required for charge reversal of parasitic power switch capacitors associated with leakage inductance of the high-power transformer.

It has been shown that by means of the circuit layout selected in connection with this circuit arrangement, consisting of a rectifier stage, preferably a full- bridge rectifier stage, a converter stage, preferably a full- bridge converter stage, a control stage and a high-power transformer with a connected secondary-circuit stage together with the special control, made available by the control stage, of the power switches provided in the converter stage, it is possible to generate a power output of 20 kW and more, for example required for operating bobbin winding machines, by means of a defined sufficiently constant commercial power supply, regardless of the voltage of the commercial power supply. Because of the special triggering of the converter stage it is advantageously possible to transfer this high power output via a power switch without extensive cooling means being required or without having to employ several parallel converter stages. This is aided in particular in that triggering of the power switches takes place by means of a phase-shift mode with zero voltage switching and that, not only the pulse width of the rectangular AC voltage generated by the converter stage is set for regulating the desired supply voltage, but also the frequency of this AC voltage is variably set in such a way that it is possible to reverse the charge of the parasitic capacitances of the power switches respectively by means of an amount of energy sufficiently stored in the leakage inductance of the high-power transformer. To this end the current in the primary transformer winding is respectively set as high as possible, but without overloading the transformer.

Preferably, according to the electrical circuit of the present invention, the high-power transformer is designed for a minimal primary intermediate circuit DC voltage for a predetermined power output at a predetermined rated switching frequency.

It is further preferred that within the electrical circuit of the present invention the control stage triggers the insulated gate bipolar transistor (IGBT) switches in such a way that the difference of the average values of the positive or negative signal portions of the transformer primary winding current is controlled to be zero. The high-power transformer is accordingly symmetrically triggered, which makes the employment of a suitable high-power transformer in the required power range easier, in that its magnetic material is symmetrically switched out along the positive and negative areas of the characteristic magnetization curve.

DETAILED DESCRIPTION OF THE PREFERRED EMBODIMENT

Figure 1:
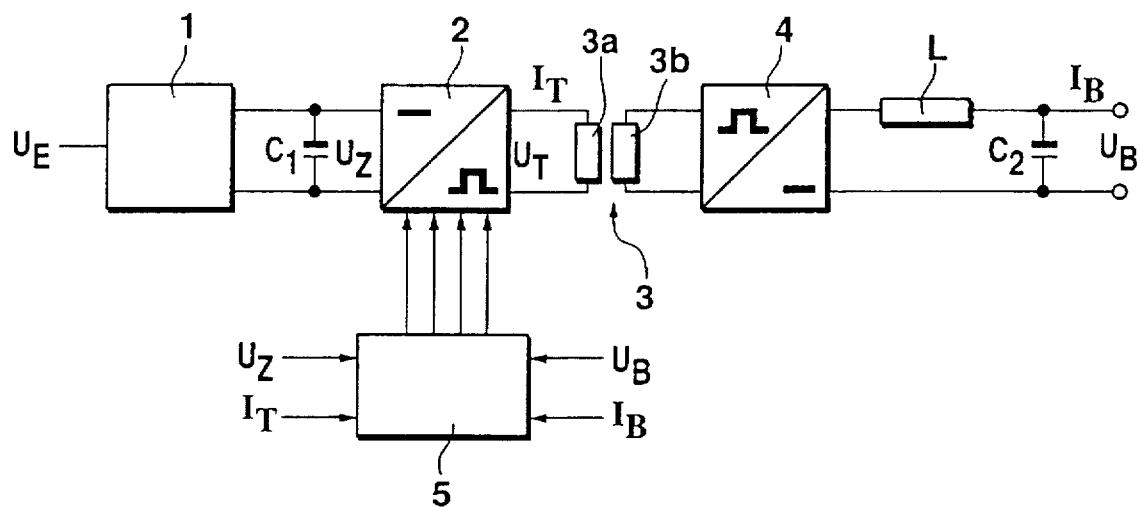
FIG. 1 is a block diagram of an electrical circuit for transforming a multiplicity of commercial power voltages to a supply voltage, which is independent of the respective commercial power voltage according to the preferred embodiment of the present invention.

Turning now to the drawings, and, more particularly to FIG. 1, an electric circuit for conversion of a multiplicity of commercial power voltages to a supply voltage which is independent of the respective commercial power voltage is illustrated generally at 10 in FIG. 1 and includes a primary intermediate circuit 12, a secondary intermediate circuit 14 and a control circuit 5. As will be seen presently, the terms, "stage" and "circuit" are effectively interchangeable throughout the present text.

Beginning from the input side, the primary intermediate circuit 12 represented in FIG. 1 includes a bridge rectifier stage 1 of conventional design, which need not be further described here, which rectifies a commercial power voltage $U_E$ present at the input to a primary intermediate circuit DC voltage $U_Z$, which is stabilized by a capacitor $C_1$. In this case, the commercial power voltage $U_E$ present at the input side may have any arbitrary voltage as may be customary all over the world, of between approximately 180 V and approximately 660 V. Depending on the layout of the system, the primary intermediate circuit DC voltage $U_Z$, generated by the bridge rectifier stage 1 by means of rectification and filtering of the power voltage $U_E$, has values between approximately 300 V and approximately 1000 V. The primary intermediate circuit DC voltage $U_Z$ is converted by a full bridge converter stage 2 with four triggerable transistor power switches, which are insulated gate bipolar transistors (IGBT), into a rectangular AC voltage $U_T$, which represents the transformer primary winding voltage of a high-power transformer 3 having a primary winding 3a and a secondary winding 3b. One of the transformer types sold by the Vakuumschmelze GmbH under the designations Vitroperm and Vitrovac, for example, can be used here as high-power transformer 3 for the power range of 20 kW or more as required by the present bobbin winding machine. The primary winding 3a of the high-power transformer 3 is located in the output circuit of the full bridge converter stage 2. A rectifier stage 4 and a smoothing circuit including an inductor L and a capacitor $C_2$ follow the secondary winding 3b to constitute the secondary intermediate circuit 14, from which it is possible to pick up the secondary intermediate circuit DC voltage $U_B$ as the supply voltage for the bobbin winding machine (not shown) with an associated secondary circuit current $I_B$, wherein this supply voltage $U_B$ is supplied to the various electrical applications associated with the bobbin winding machine in an appropriately further processed manner. These applications may include sensors, active elements, electronic controls, step motors and electrically commutated DC voltage motors.

A secondary intermediate circuit DC voltage $U_B$ between 250 V and 280 V is typically required for the bobbin winding machine. In order to make this supply voltage available independently of the rated voltage $U_E$ of the supplying power grid respectively available at the input side, the four insulated gate bipolar transistor (IGBT) power switches of the full bridge converter stage 2 are triggered in a special way by the control stage 5 as a function of the primary intermediate circuit DC voltage $U_Z$, the transformer primary winding current $I_T$ and of the supply voltage $U_B$ and the supply current $I_B$, so that the frequency and pulse width of the output voltage of the full bridge converter stage 2, i.e., the transformer primary winding voltage $U_T$, is suitably regulated. To this end triggering of the full bridge converter stage 2 by the control stage 5 takes place in a phase-shift mode in such a way that zero-voltage switching on and off of the transistor power switches is assured. The phase-shift mode causes the charge of the parasitic capacitances of the transistor power switches to be reversed by means of the energy stored in the leakage inductance of the high-power transformer 3. This energy stored in the leakage inductance of the transformer 3 is a function of the transformer primary winding current $I_T$. The minimum energy required for reversing the charge is determined by the value of the respective parasitic power switch capacitance.

Figure 2:
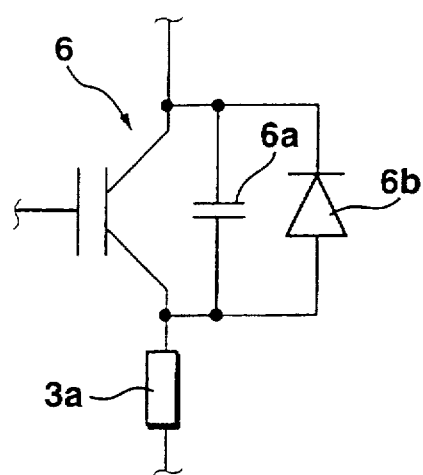
FIG. 2 is a schematic circuit diagram of an IGBT power switch used in a full-bridge transformer stage, and of the primary winding of a high-power transformer used in the preferred embodiment of the circuit illustrated in FIG. 1.

This charge reversal can be clearly understood by observing the circuit diagram in FIG. 2. Because of its design, the IGBT power switch 6, represented there in lieu of all four power switches for clarity, contains a parasitic capacitor 6a and a diode 6b arranged in parallel with its switching section. Together with the transformer leakage inductance of the transformer primary winding 3a, placed in series with the switching section of the respective transistor power switch 6, an oscillating circuit results which, by means of a defined phase position of the time period the IGBT power switches are turned on, is used by the pulse width modulating device of the control stage 5 in such a way, that the power switches are zero-voltage switched.

To optimize cost savings, the high-power transformer 3 is preferably designed for a minimal intermediate circuit voltage $U_Z$ for a predetermined power output of the circuit at a predetermined switching frequency. Typical rated switching frequencies lie in the range of up to 50 kHz, for example. In order to make zero voltage switching possible at the largest possible input voltage and output power range, the control stage 5 performs control in a manner wherein the energy stored in the leakage inductance of the high-power transformer 3 is sufficient for charge reversal of the capacitive power switch capacitances. To this end the switching frequency is varied as a function of the primary intermediate circuit DC voltage $U_Z$ and the demanded output power in such a way that the transformer primary winding current $I_T$ attains maximum values without overloading the transformer 3. The control stage 5 simultaneously sets the transformer primary winding voltage $U_T$ variably in such a way that the secondary intermediate circuit DC voltage $U_B$ is regulated to attain the desired value.

If, for example, one of the mentioned transformer types marketed under the designations Vitroperm and Vitrovac, is employed, the high-power transformer should be operated in such a way that its magnetic material is symmetrically switched out along the positive and negative areas of the characteristic magnetization curve. This is achieved during control performed by the control stage 5 by an appropriate selection of the length of time the individual power switches are switched on. In this case the transformer primary winding current $I_T$ is used as the manipulated variable, and the control stage 5 controls the difference of the average values of the positive or negative signal portion of the transformer primary winding current $I_T$ to be zero.

Considerable advantages accrue when using the circuit according to the present invention for the energy supply of a bobbin winding machine or any other device with high power requirements of up to 40 kW. By means of the employment of low loss, zero-voltage-switching IGBT power switches in the full bridge converter stage, and of a suitable high-power transformer, it is possible to achieve an efficiency of the circuit arrangement of greater than 0.9. The commercial power grid voltage is converted to the desired secondary intermediate DC voltage with a high degree of output voltage stability using frequency and pulse width modulation, independently of different commercial power voltages and voltage fluctuations of the respective supply power grid. In comparison with the conventional thyristor solutions in 50 Hz/60 Hz technology there is a clear reduction in space requirements and weight in the corresponding output range. The entire circuit arrangement in FIG. 1 can be realized at a typical weight of between approximately 30 kg and 50 kg. The component outlay is comparatively low because of the special control of the full bridge converter stage, in particular, only little cooling is required because of the saturation voltage of the IGBTs of approximately 2 V to 3 V. Furthermore, no more than four power switches are required. The transformer assures the demanded dependable electrical separation between the power commercial and the secondary intermediate circuit.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention.

The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An electrical circuit for the conversion of a multiplicity of commercial power voltages into a supply voltage for use with a device with high electrical power requirements, such as a textile bobbin winding machine, said supply voltage being independent of the respective commercial power voltage, said electrical circuit comprising:

a rectifier assembly for generating a primary intermediate circuit DC voltage in a range of approximately 300 V to approximately 1000 V by rectifying and filtering the commercial power voltage having a range of values between approximately 180 V and approximately 600 V;

a converter assembly having a plurality of triggerable power switches for converting said primary intermediate circuit DC voltage into an AC voltage having a rectangular waveform;

a high-power transformer having an intermediate circuit connected thereto for transforming said AC voltage having a rectangular waveform into said supply voltage; and a control assembly for switching said power switches at zero voltage responsive to the primary intermediate circuit DC voltage, the current in the primary winding of said high-power transformer, and the voltage and the current in the secondary intermediate circuit, said control assembly switching said power switches using a variable pulse width of the AC voltage having a rectangular waveform required for achieving a predetermined supply voltage.

2. An electrical circuit according to claim 1 wherein said control assembly for switching said power switches at zero voltage responsive to the primary intermediate circuit DC voltage, the current in the primary winding of said high power transformer, and the voltage and the current in the second intermediate circuit, using said variable pulse width of the AC voltage having a rectangular waveform and a variable frequency for setting a transformer primary winding current, which is sufficient for storing the energy required for charge reversal of parasitic switch capacitors associated with leakage inductance of said high-power transformer.

3. An electrical circuit according to claim 1 wherein said high-power transformer is configured for a minimal primary intermediate circuit DC voltage for a predetermined power output at a predetermined switching frequency.

4. An electrical circuit according to claim 3 wherein said power switches within said converter stage are insulated gate bipolar transistors and said control stage triggers said insulated gate bipolar transistor switches in a manner wherein the difference of the average values of the positive or negative signal portions of the transformer primary winding current is controlled to be zero.

5. An electrical circuit according to claim 1 wherein said high-power transformer comprises core magnetic material that is lightweight and provides an efficiency of at least 0.9.

* * * * *